June 14, 1949.  L. D. ADAM ET AL  2,473,324
FISHING LURE
Filed June 28, 1946
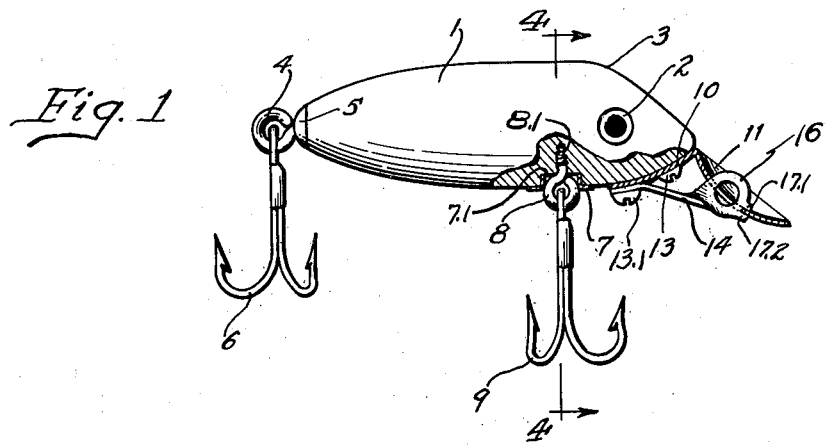
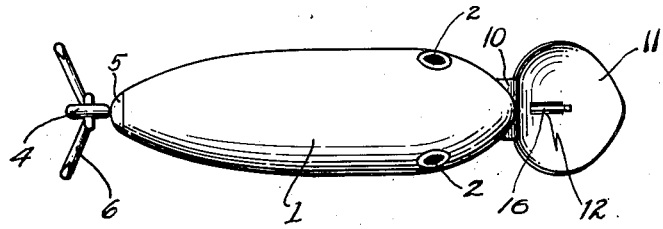
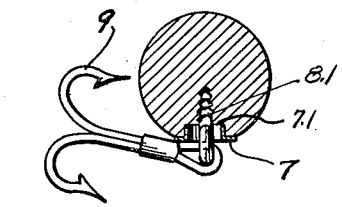
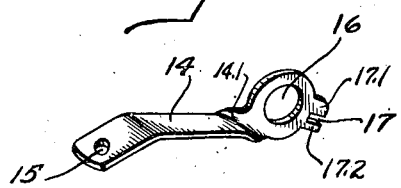
Inventors:
Louis D. Adam
Nelia J. Poplin
BY: Rummler Rummler and Davis Patented June 14, 1949

2,473,324

UNITED STATES PATENT OFFICE 2,473,324

FISHING LURE

Louis D. Adam and Nelia G. Poplin, Ponca City, Okla., assignors to Pachner & Koller, Inc., Chicago, Ill., a corporation of Illinois Application June 28, 1946, Serial No. 680,258

6 Claims. (Cl. 43—42.47)

This invention relates to improvements in fishing lure constructions.

The main objects of this invention are to provide a simple, inexpensive, and easily manufactured lure; to provide a fishing lure which will rise and dive as it is drawn through the water; to provide a lure having a slotted cup or plate-shaped member secured to the front end thereof; to provide a fishing lure having a lip or spoon which is securedly braced in position; to provide a device of this character wherein a brace is secured between and to the body and a spoon-shaped lip portion extending forwardly of the body; to provide a fishing lure having a diving lip or spoon attached thereto, and lying forwardly of the foremost portion of the body, of such construction that the possibility of bending or displacing it is minimized; and to provide a device of this character with a brace having an eyelet positioned at right angles thereto adapted to be threaded through the lip.

An illustrative embodiment of this invention is shown in the accompanying drawings in which:

Fig. 1 is a side elevational view of my invention, the front portion thereof being broken away and in section.

Fig. 2 is a top elevational view thereof.

Fig. 3 is a perspective view of the brace and grooved lip.

Fig. 4 is a sectional view taken on line 4—4 of Fig. 1, but with the treble hook bent at right angles to position shown in Fig. 1.

Referring in detail to the drawing, the lure comprises an elongated body 1 generally circular in cross section, preferably constructed of a buoyant material such as wood or the like, which is tapered to a substantial point at either end. Artificial eyes 2 are positioned one on each side of the body 1 at a point adjacent the forward end thereof. A sloping forehead 3 extending downwardly from the top of the forward end of the body 1 aids in forming the front point of the lure and streamlines the forward end of the body so as to offer less resistance as it is pulled through the water.

A screw eyelet 4 is axially threaded into the rear end of the body 1 with the inwardly facing surface thereof bearing against the domed grommet 5 so as to anchor the latter securely on the point formed at the rear end of the body. Depending gang or treble hooks 6 are secured to the eyelet 4 in the usual manner.

A flanged tubular like grommet 7, open at both ends, is adapted to fit snugly into the bore 7.1 positioned in the underside of the body 1 forwardly of and adjacent the vertical center line of the lure. An eyelet 8 slightly larger in diameter than the grommet, has a threaded shank 8.1, which is threaded through the grommet 7 and anchored in the body 1 at a depth whereby the eyelet 8 will abut against the grommet 7 to keep the grommet firmly secured within the bore 7.1 as is clearly shown in Fig. 1. A second depending treble or gang hook 9 is secured to the eyelet 8 in the usual manner. Seating the eyelet 8 within the grommet 7 restricts the swing of the hook 9 so as to prevent the hooks from coming into contact with any part of the body no matter at what angle the hooks 9 are swung, as clearly illustrated in Fig. 4, and thereby prevents the hooks from scratching or marring the surface of the body 1.

The spoon or saucer-shaped lip is preferably constructed of non-corroding metal and comprises an arm 10, curved to conform to the shape of the forward underside of the body 1 and an integrally formed saucer-like shaped lip or spoon 11. The lip 11 is bent downwardly at an oblique angle from the arm 10, and has a medially positioned elongated longitudinal slot 12 contained therein. The arm 10 is secured flush against and to the forward underside of the body 1 in any suitable manner such as by wood screws 13 and 13.1 which are threaded through suitable apertures contained in the arm 10 and anchored in the body 1.

A brace, preferably constructed from a stiff non-corrosive metal comprises a flat main body portion 14 having a screw receiving aperture 15 in the rear end thereof and a line attaching eyelet 16 in the forward end thereof. The body portion 14 has a half twist 14.1 at the base of the eyelet 16 so as to position the eyelet at right angles to the body 14 as is clearly illustrated in Fig. 3. The eyelet 16 is of a thickness adapted to fit snugly within the slot 12. The eyelet 16 is also provided with a pair of parallelly disposed longitudinally extending arms 17.1 and 17.2 whereby a longitudinally extending slot 17 is formed therebetween. The arms and slot simulate a jaw.

The arm 17.1 is adapted to be threaded into the slot 12 so as to have a portion of the lip 11 seat snugly between and be held by the arms in a jaw-like fashion. In so doing, substantially the entire eyelet 16 is threaded through the slot 12 and seats snugly therein so that a portion thereof extends above the slot 12 to form a line securing connection. Screw 13.1 is threaded through the aperture 15 contained in the rear end of the brace 14 and is anchored to the body 1 thereby securing the brace rigidly to the body 1 and to the lip 11. The jaw-like arms 17.1 and 17.2 of the eyelet 16 prevent the lip 11 from being shifted in a vertical plane.

From the foregoing description it will now be clear that the brace 14 will prevent the lip 11 from being moved out of position once it is secured to the body 1 in the above described manner.

Although several embodiments of this invention have been herein shown and described, it shall be understood that numerous details of the construction shown may be altered or omitted without departing from the spirit of this invention as defined by the following claims.

We claim:

1. A fishing lure comprising an elongated body, a downwardly inclined substantially saucer-like shaped member secured to the forward end of said body and having a slot therein; and a brace having a line receiving eyelet in one end thereof, said brace being secured at one end to the forward end of said body, said eyelet adapted to partially extend through said slot and secured to said substantially saucer-like shaped member.

2. A fishing lure comprising an elongated body, an arm secured to the forward underside of said body, a downwardly inclined saucer-like shaped lip integrally secured to the forward end of said arm, and a brace having one end thereof secured to the forward underside of said arm and having the other end secured to said lip.

3. A fishing lure comprising an elongated body, an arm having one end thereof secured to the forward underside of said body, a downwardly inclined saucer-like shaped lip integrally secured to the forward free end of said arm having a longitudinal slot therein, a brace, and an eyelet integrally formed on one end of said brace adapted to partially extend through said slot and secured to said lip, the free end of said brace being secured to the forward underside of said body.

4. A fishing lure comprising an elongated body tapering to a point at either end, to simulate a fish, an arm secured to the forward underside of said body, a downwardly inclined saucer-like shaped lip integrally secured to the forward end of said arm and having a slot medially positioned therein, and a brace comprising a body portion and having an eyelet integrally secured to the forward end thereof and positioned at right angles thereto adapted to extend partially through said slot and be secured to said lip.

5. A fishing lure comprising an elongated body tapering to a point at either end simulating a fish, an arm secured at one end to the forward underside of said body, a downwardly inclined saucer-like shaped lip integrally secured to the forward end of said arm and having a medially positioned elongated slot therein, and extending longitudinally of the axes of the body, a brace comprising a body portion having one end thereof secured to the underside of said body, an eyelet integrally secured to the forward end of said body portion, and positioned at right angles thereto, and jaws integrally secured to the forward end of said eyelet, said eyelet extending partially through said slot and secured to said lip by said jaws.

6. A fishing lure comprising an elongated body tapering to a point at either end to simulate a fish; an arm having one end thereof secured to the forward underside of said body; a downwardly inclined saucer-like shaped lip integrally secured to the front end of said arm and having a medially positioned elongated slot therein and extending longitudinally of the axis of the body; a brace comprising a narrow flat body strip, the rear end thereof being secured to the underside of said body, and an eyelet at the forward end of said body strip and positioned at right angles thereto; said strip having a pair of spaced arms at the front end of said eyelet to form a jaw adapted to be inserted into said elongated slot and grasp said lip therebetween.

LOUIS D. ADAM.
NELIA G. POPLIN.

REFERENCES CITED

The following references are of record in the file of this patent:

UNITED STATES PATENTS

| Number | Name | Date |
|---|---|---|
| 1,017,324 | Ryan | Feb. 13, 1912 |
| 1,211,160 | Jennings | Jan. 2, 1917 |
| 1,615,803 | Pflueger | Jan. 25, 1927 |
| 1,898,200 | Medlin | Feb. 21, 1933 |